(12) United States Patent
Alumbaugh et al.

(10) Patent No.: US 7,477,577 B2
(45) Date of Patent: Jan. 13, 2009

(54) CLOSED-LOOP SYSTEM FOR MASTERING, CERTIFICATION AND PRODUCTION OF COMPACT DISCS

(75) Inventors: Michael Alumbaugh, Wichita, KS (US); Angel Ferran, Jr., Wichita, KS (US); Dwight Thurber, Haysville, KS (US)

(73) Assignee: LSI Corporation, Milpitas, CA (US)

( * ) Notice: Subject to any disclaimer, the term of this patent is extended or adjusted under 35 U.S.C. 154(b) by 1229 days.

(21) Appl. No.: 10/633,224

(22) Filed: Jul. 31, 2003

(65) Prior Publication Data

US 2005/0025024 A1 Feb. 3, 2005

(51) Int. Cl.
*G11B 5/09* (2006.01)
*G03H 1/00* (2006.01)
(52) U.S. Cl. .......................... 369/47.1; 359/1
(58) Field of Classification Search ............. 369/47.1; 359/1

See application file for complete search history.

(56) References Cited

OTHER PUBLICATIONS

"Sun Product Documentation," www.docs.sun.com, Application Packaging Developer's Guide, Sun Microsystems, Products & Services, Support & Training.

*Primary Examiner*—Joshua L Pritchett
(74) *Attorney, Agent, or Firm*—Cochran Freund & Young LLC

(57) ABSTRACT

Disclosed is a process of manufacturing electronic media that ensures that all files on the media are functional duplicates of the master copy of the media and provides CD-ROM software with low lead-time, as well as, providing a high amount of product reliability and readability through the use of the ISO format. This process ensures the production of defect free disks through the utilization of electronic means of transferring data, minimization of process steps, minimization of physical touches, verification of data integrity at every point where data is transferred and by a final certification through a functional test of the disk. The disclosed process further includes just-in-time processes that allow the short-term demand of the electronic media to regulate the quantities of product that is manufactured.

19 Claims, 4 Drawing Sheets

CLOSED-LOOP SYSTEM FOR MASTERING, CERTIFICATION AND PRODUCTION OF COMPACT DISCS

BACKGROUND OF THE INVENTION a. Field of the Invention

The present invention generally pertains to systems for creating commercial software and more particularly to high-volume manufacturing systems that create compact discs through a closed-loop process.

b. Description of the Background

Compact discs containing read only memory (CD-ROM or CD's) are used to distribute large amounts of data and large software packages quickly, easily and inexpensively. Once a software package has been created and tested, it is copied onto a CD for distribution. The CD can then be loaded into a computer, and the software on the CD can be used by the computer.

The process for marrying the artwork and data files into a production master file that manufactures CD's contains a number of opportunities to damage the software and data files. Each entity involved in the process of examining the software and data files may unknowingly corrupt them, resulting in errors that may appear on subsequent versions of the files including the master CD and master job file. Such errors may not be noticed until testing of a prospective master CD and can potentially corrupt all subsequent copies of the file that was originally corrupted. This may require creation of a new master CD or, depending on the level of severity, completely purging all old copies and starting over, even though part of the intended material is correct.

The manufacturing process itself may also damage the master CD. Machines and media used for manufacturing may fall out of tolerance or be damaged resulting in the production of corrupt disks, even though the master files are correct. Even after a master CD is created, each entity that touches it may unknowingly corrupt it, resulting in damage to the master CD. Typically, manufacturing processes use buffer inventory to fill order requirements. However, the combination of frequent software updates and stockpiling inventory may cause economic losses due to inventory carrying related costs or obsolescence.

It would therefore be advantageous to create a process of manufacturing CD's that minimizes opportunities for corruption of the files before they are mastered, thus ensuring that all files on all CD's are functional duplicates of the master. It would also be advantageous if such a process could minimize opportunities to damage a master CD and ensure that a newly created CD is free from defects and in an internationally standardized ISO format that is readable by other computers. It would further be advantageous if the process includes just-in-time processes that allow manufacturers to create only as many CD's as can be readily distributed.

SUMMARY OF THE INVENTION

The present invention overcomes the disadvantages and limitations of the prior art by providing a process of manufacturing electronic media that ensures all files on the media are functional duplicates of the master copy of the media and provides CD-ROM software with the lowest amount of lead-time, as well as, providing the highest amount of product reliability using an internationally standardized ISO format. This process ensures the production of defect free disks through the utilization of electronic means of transferring data, minimization of process steps, minimization of physical touches, verification of data integrity at every point where data is transferred and by a final certification through a functional test of the disk. The disclosed process further includes just-in-time processes that allow the short-term demand of the electronic media to regulate the quantities of product that is manufactured.

In one embodiment, a master compact disc is created by combining previously verified electronic data files into an ISO image file that is re-verified before being copied onto a compact-disc-making machine. The compact-disc-making machine then copies the image file onto a blank compact disc to create a master compact disc. The master compact disc is then verified for accuracy and functionality before it is certified. The image file is then copied to production compact discs, which then fulfill customer orders.

The present invention may therefore comprise a method of manufacturing computer media containing digital electronic executable programming files and non-executable data files comprising: providing a set of master files for duplication, said master files comprising digital electronic executable programming files and non-executable data files; verifying that said master files are complete and functional; combining said master files into an image file; verifying that said image file contains a functional duplicate of said master files; storing said image file on a memory device; verifying that said memory device contains a functional duplicate of said image file; copying said image file from said memory device to a master compact disc; extracting any graphical representation material contained in said image file; labeling a surface of said master compact disc with said graphical representation material contained in said image file; verifying that said master compact disc contains a functional duplicate of said image file; verifying that said surface of said master compact disc displays a functional duplicate of said graphical representation material contained in said image file; copying said image file from said memory device to a compact disc-making machine; copying said image file from said compact disc-making machine to a blank compact disc to produce a production compact disc; verifying that said production compact disc contains a functional duplicate of said graphical representation material contained in said image file; and, verifying that said production compact disc contains a functional duplicate of said image file from said compact-disc-making machine.

The present invention may further comprise a compact disc containing digital electronic executable programming files and non-executable data files created by a process comprising: providing a set of master files for duplication, said master files comprising digital electronic executable programming files and non-executable data files; verifying that said master files are complete and functional; combining said master files into a image file; verifying that said image file contains a functional duplicate of said master files; storing said image file on a memory device; verifying that said memory device contains a functional duplicate of said image file; copying said image file from said memory device to a master compact disc; extracting any graphical representation material contained in said image file; labeling a surface of said master compact disc with said graphical representation material contained in said image file; verifying that said master compact disc contains a functional duplicate of said image file; verifying that said surface of said master compact disc displays a functional duplicate of said graphical representation material contained in said image file; copying said image file from said memory device to a compact disc-making machine; copying said image file from said compact disc-making machine to a blank compact disc to produce a production compact disc;

verifying that said production compact disc contains a functional duplicate of said graphical representation material contained in said image file; and, verifying that said production compact disc contains a functional duplicate of said image file from said computer.

The present invention may also comprise a system of manufacturing computer media that contains digital electronic executable programming files and non-executable data files comprising: a set of master files for duplication, said master files comprising digital electronic executable programming files and non-executable data files; a first comparator that verifies that said master files are complete and functional; a computer that receives and combines said master files and creates a image file for mass production; a second comparator that verifies that said image file contains a functional duplicate of said master files; a memory device within said computer that stores said image file; a third comparator that verifies that said memory device contains a functional duplicate of said image file; a master compact disc that receives a copy of said image file from said memory device; a fourth comparator that verifies that said master compact disc contains a functional duplicate of said image file; a first labeling device that receives an output of graphical representation material contained in said image file and labels said master compact disc with said graphical representation material; a fifth comparator that verifies that said master compact disc displays a functional duplicate of said graphical representation material contained in said image file; a compact disc-making machine that receives a copy of said image file from said memory device within said computer and reproduces said image file on a blank compact disk to create a production compact disc; a second labeling device that utilizes said graphical representation material contained in said image file and labels a said production compact disc with said graphical representation material; a sixth comparator that verifies that said production compact disc contains a functional duplicate of said graphical representation material contained in said image file; and, a seventh comparator that verifies that said production compact disc contains a functional duplicate of said image file from said computer.

The advantages of the disclosed process and system include the ability to minimize corruption of data files while being copied and minimizing corruption of master copies of electronic media that can lead to mass duplication of incorrect data. This process and system verifies that master copies of electronic media are unchanged after each duplication or handling step to assure accuracy in the final product output, reduces product reject rates and field failures which ultimately reduces product cost. The disclosed embodiments also lend themselves to just-in time or demand manufacturing which reduces inventory, eliminates the need for stockpiling, and limits the amount of product inventory that is subject to obsolescence when new software versions and revisions are released.

DETAILED DESCRIPTION OF THE INVENTION

Many CD's contain both a copy of their executable or program software and a separate set of data and/or artwork files. These files may contain the label that is placed or printed on the CD surface, the artwork to be placed in the CD container, and instructions for proper use of the software. These software and data files typically undergo separate testing procedures anytime the files are moved, integrated or transferred to a different media to ensure their accuracy and proper function. Artwork and data files are typically combined into a single job file that is used for production purposes. The individual files that are transferred into the job file are tested against the original individual files to ensure the data has not changed. After one CD has been created that contains all desired execution software and data files, it undergoes testing that verifies the data on the CD against the master job file to ensure that the data has not changed. If the data deviates from the original, the test automatically rejects the disk. If the CD passes, the disk is then installed in a system to verify the functional properties of the software. At the point where a CD successfully completes this phase of the testing, it is designated as a final or "master" CD. Future reproductions of the CD are generated from the electronic job files and not from other hardware such as tapes or "master" CDs that can get scratched, oxidized or physically degrade over time.

Figure 1A:
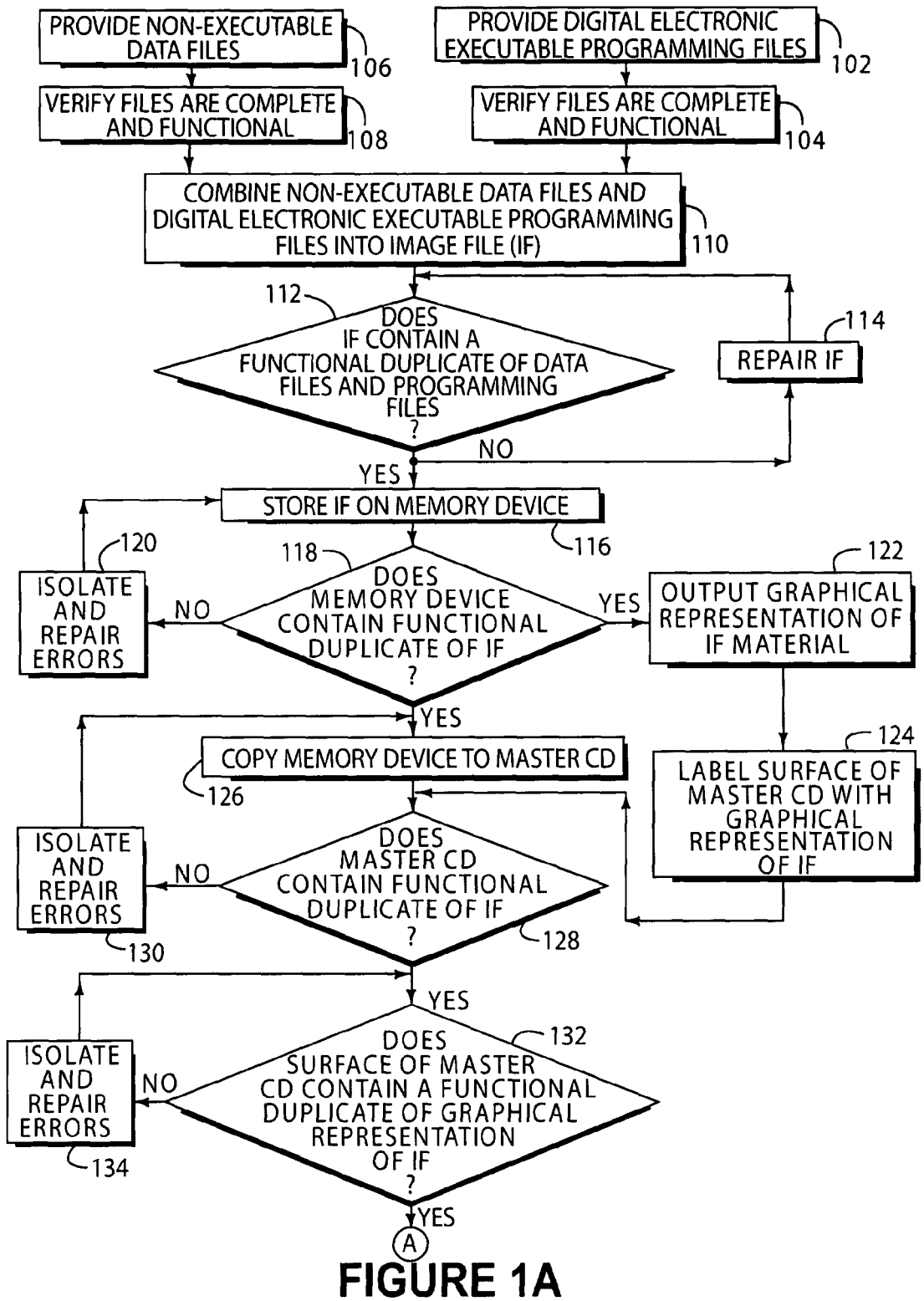
FIGS. 1A and 1B are a schematic representation of the elements involved in a typical embodiment for a method of creating a production computer disc.
Figure 1B:
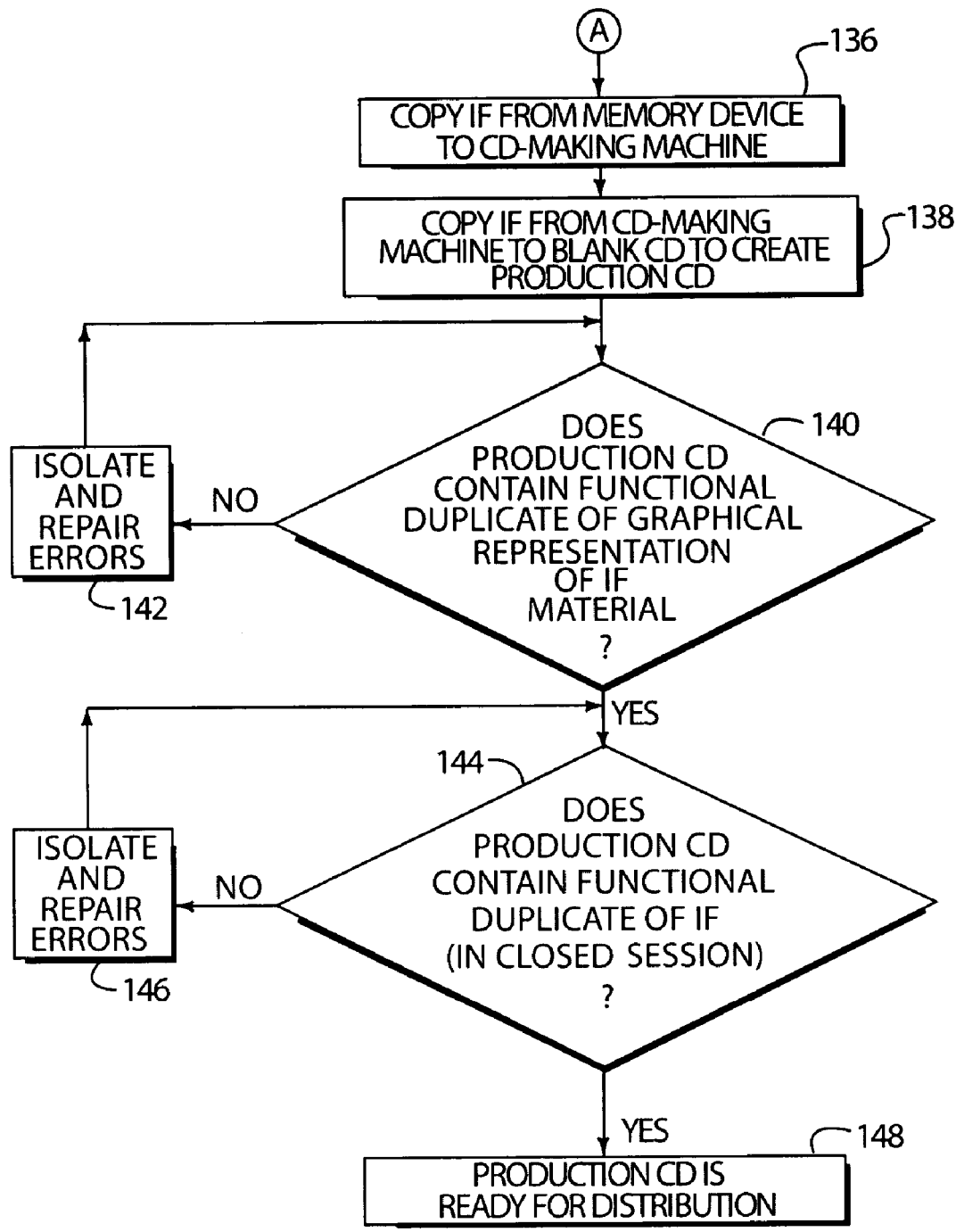

FIGS. 1A and 1B are a schematic representation of the elements involved in a typical embodiment for a method of creating computer media, such as a production CD. The steps involved in this process are designed to certify the accuracy of the first disk produced as well as the machine that will be used in the production process. Any time data is moved, uploaded, downloaded or transferred to a different type of media a verification check is performed to validate the integrity of the new file versus the original. If a change is detected, the disk is treated as a failure and corrective steps taken. To prevent possibly burning disks to defective media, the manufacturing machines are set to verify 100% of production CD's against the original files. Digital electronic executable programming files and non-executable data files are provided at steps 102 and 106, such as those typically utilized in commercial software packages. Non-executable data files may include such items as artwork for the cover of the CD container or jewel case and documentation of the executable programming files. The documentation may include such items as instruction manuals for users of the executable programming files. These files are each verified for completeness and functionality at steps 104 and 108 respectively by typical software testing methods. The verified executable programming files and non-executable data files are then combined into a single image file (IF) at step 110 so that they contain all of the material to be included in the production CD. The IF is verified and tested by typical testing methods to check for a functioning duplicate at step 112 with the outcome of this test either ensuring that the executable programming files and non-executable data files have not been changed during creation a storing of the IF onto a memory device at step 116. If a change or error is detected, an IF repair is initiated at step 114. Verification of the IF at step 110 may be performed by an MD5 data check available in the Unix computer operating system that creates a checksum file to be compared to the contents of the original file.

After the IF is stored on a memory device at step 116, the memory device may be checked at step 118, with a data check such as MD5, to ensure that the memory device contains a functional duplicate of the IF. If the memory device does not contain a functional duplicate of the IF, the files may be isolated and repaired at step 120 as necessary until it does contain a functional duplicate. Once the memory device has been verified to contain a functional duplicate of the IF 118, the material in the memory device may be copied to a master CD at step 126, which is stored for emergency recovery purposes. Production of disks utilizes the IF stored on the memory device.

When the memory device is being verified for a functional duplicate of the IF at step 118, the IF portion containing graphical representations (such as silk-screen, jewel case or label data) is extracted and output at step 122 and used to label the master CD. The master CD is checked to verify that it does contain a functional duplicate of the IF. A negative response initiates a process by which the files may be isolated and repaired at step 130 as necessary until the master CD does contain a functional duplicate. At that point, the surface of the master CD is verified to contain a functional duplicate of the graphical representation of the IF at step 132. This can be performed with a visual or other non-computerized check, to ensure that it contains a functional duplicate of the graphical representation of the IF. Similarly, as in the above detailed verification steps, a negative response initiates a process by which the graphic files or printing processes causing the errors may be isolated and repaired at step 134 as necessary until the master CD does contain a functional duplicate of the graphical representation of the IF.

Once the master CD is verified to contain both a functional duplicate of the IF and the graphical representation of the IF material at step 132, the IF may be copied from the memory device to a CD-making machine at step 136 that contains sufficient on-board memory to hold the entire IF. After the CD-making machine is verified to hold the entire correct IF at step 140, such as by an MD5 check, the CD-making machine can duplicate the master CD by copying the IF to a blank CD at step 138, thereby transforming the blank CD into a production CD.

The production CD may then be verified by comparison with the computer memory of the CD-making machine or by visual inspection to contain a functional duplicate of the graphical representation of the IF material copied to the CD-making machine at step 140 and sources of errors may be isolated and repaired at step 142 as necessary until the production CD does contain a functional duplicate of the graphical representation of the IF material. Upon successful completion of the graphical representation verification at step 140, the production CD may be verified at step 144 to contain a functional duplicate of the IF in a closed session on the CD-making machine and repaired at step 146 until it does contain a functional duplicate. This closed session means closed or locked to changes or revisions being made to the files. Once the production CD contains both a functional duplicate of the graphical representation of the IF data material, the production CD is deemed ready for mass production at step 148 and this duplicating process can be repeated as many times as necessary to fill immediate demand for the product.

Figure 2:
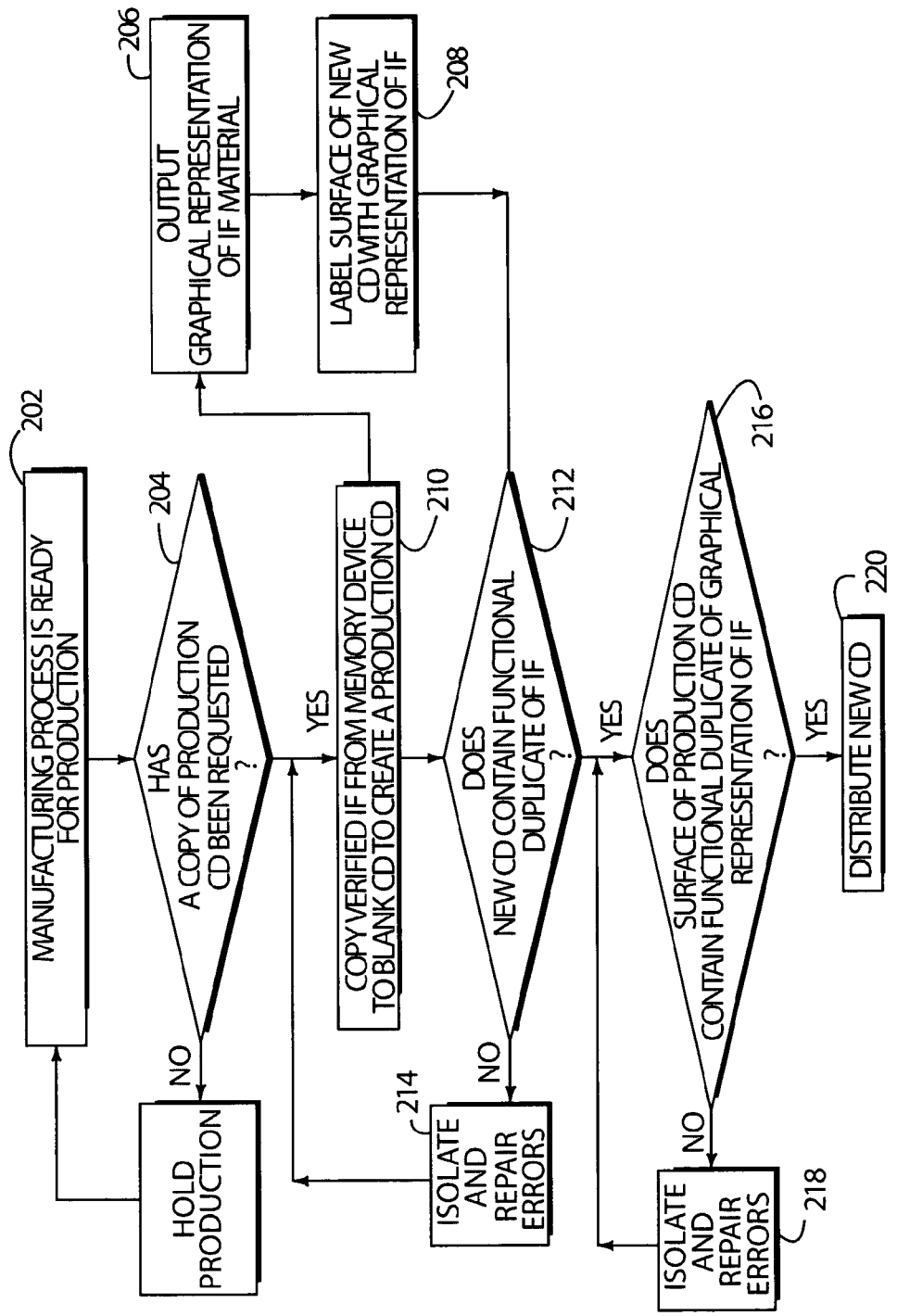
FIG. 2 is a schematic representation of a typical embodiment for a just-in-time method of compact disc production for commercial distribution.

FIG. 2 illustrates a schematic representation of a typical embodiment for a just-in-time method of compact disc production for commercial distribution. The manufacturing process for producing a finished CD product may be deemed ready for mass production at step 202, but may not be manufactured until a copy of the product is actually requested by a prospective user at step 204. Upon receipt of request for a production CD, the CD-making machine can produce a production CD by copying the IF to a blank CD at step 210, thereby transforming the blank CD into a production CD.

The initiation of a production CD request will also initiate a verification of IF portion containing graphical representations (such as silk-screen art, label data or jewel case graphics) is output at step 206 and used to label the production CD. The production CD is checked to verify that it does contain a functional duplicate of the CIF at step 212. A negative response initiates a process by which the files may be isolated and repaired at step 214 as necessary until the production CD does contain a functional duplicate. At that point, the surface of the production CD is verified to contain a functional duplicate of the graphical representation of the IF at step 216. This can be performed with a visual or other non-computerized check, to ensure that it contains a functional duplicate of the graphical representation of the IF. Similarly, as in the above detailed verification steps, a negative response initiates a process by which the graphic files or printing processes causing the errors may be isolated and repaired at step 218 as necessary until the production CD does contain a functional duplicate of the graphical representation of the IF. Once the production CD is verified to contain both a functional duplicate of the IF and the graphical representation of the IF material at step 212, and if the surface of the new CD also contains a functional duplicate of the graphical representation of the CIF material at step 216, then the production CD is ready for distribution at step 220.

Figure 3:
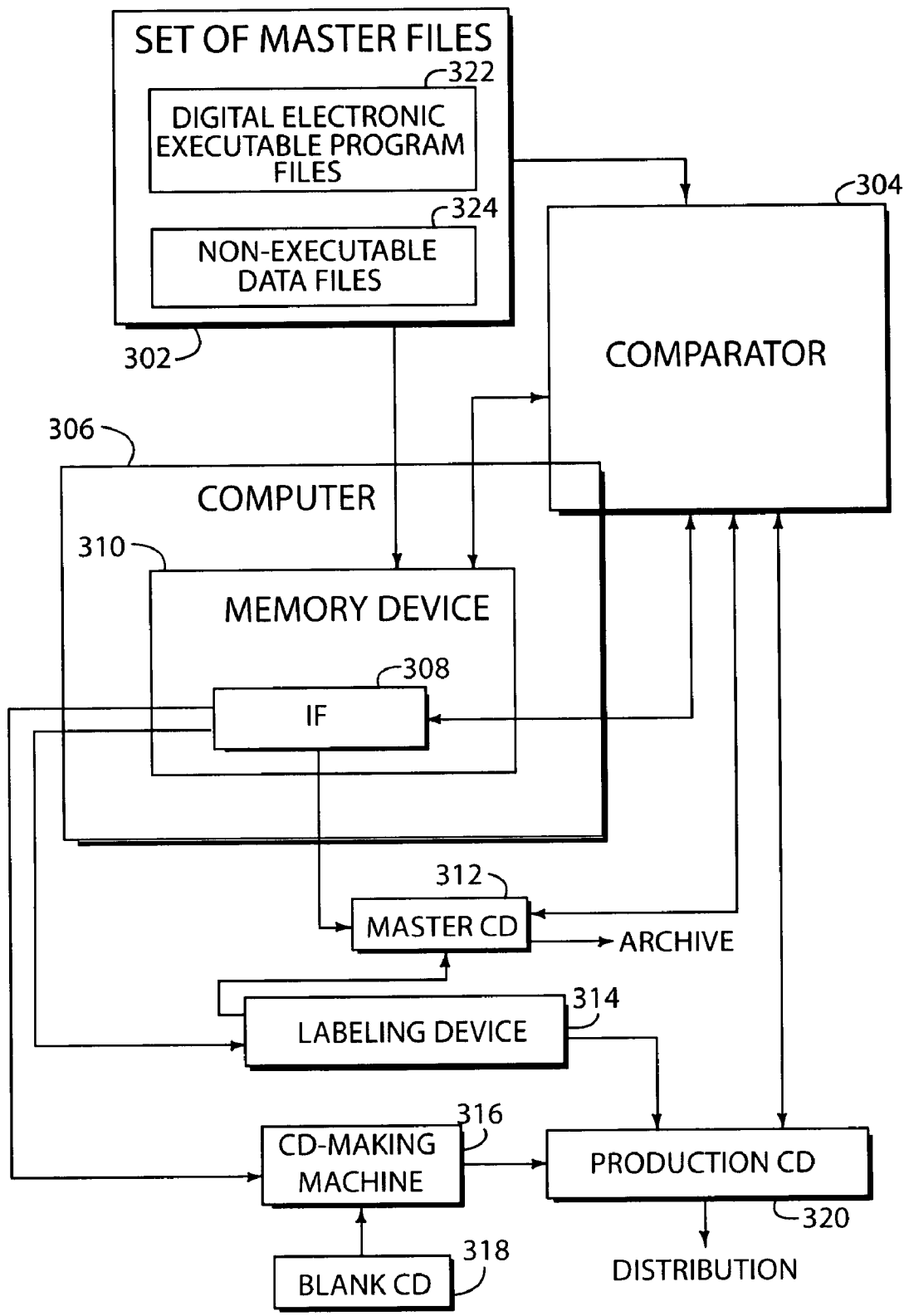
FIG. 3 is a schematic representation illustrating a typical embodiment of a system for manufacturing a compact disc.

FIG. 3 is a schematic representation illustrating a typical embodiment of a system for manufacturing a compact disc. A set of master files 302, consisting of digital electronic executable programming files 322 and non-executable data files 324 are input to a comparator 304 and compared to original reference data 326 to ensure all individual master files are complete and functional. This set of master files 302 may include graphical information and may be formatted in accordance with the International Organization for Standardization (ISO). Non-executable data files may include such items as graphics or artwork for the cover of the CD container and documentation of the executable programming files. The documentation may include such items as instruction manuals for users of the executable programming files. The set of master files 302 are transferred to a computer 306 where the verified executable programming files and non-executable data files are then combined into a single IF 308 that may contain all material to be included on a production CD.

A comparator is again used to verify that the IF 308 is a functional duplicate of the set of master files 302. After the IF 308 is verified to be a functional duplicate of the set of master files 302, the IF 308 is stored to a memory device 310 and again subject to a comparator to verify accuracy and ensure the memory device 310 contains a functional duplicate of the IF 308. After the memory device 310 contains a verified functional duplicate of the IF 308, the contents of the memory device 310 are copied to a master CD 312, which is again subject to a comparator to verify accuracy and ensure the master CD 312 contains a functional duplicate of the CIF 308.

Next, the graphical representation of the IF material 308 contained on the master CD 312 is output to a labeling device 314 that labels the master CD 312 with a functional duplicate of the graphical representation of the IF material 308. The master CD 312 is then input to the comparator 304 to ensure the surface of the master CD 312 contains a functional duplicate of the graphical representation of the IF 308. Then a CD-making machine 316 copies the IF 308 from the memory device 310 onto a blank CD 318 to create a production CD 320. The labeling device 314, which contains a graphical representation of the IF 308, labels the production CD 320 with the graphical representation of the IF 308. In many manufacturing applications, the CD-making machine 316 also does the labeling at the same time it creates the disk. Finally, the production CD 320 is input to the comparator 304 to ensure that the surface of the production CD 320 is a functional duplicate of the graphical representation of the IF 308 and that the production CD 320 is a functional duplicate of the IF 308. This verifies that the production CD 320 is a functional duplicate of the set of master files 302.

The process described above minimizes opportunities for corruption of data files or master copies of electronic media while being copied. The process verifies that master copies of electronic media are functionally duplicated when copied, and minimizes manufacturing costs associated with creating and storing copies of electronic media.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of manufacturing computer media containing digital electronic executable programming files and non-executable data files comprising:
   providing a set of master files for duplication, said master files comprising digital electronic executable programming files and non-executable data files;
   verifying that said master files are complete and functional;
   combining said master files into an image file;
   verifying that said image file contains a functional duplicate of said master files;
   repairing said image file if said image file does not contain said functional duplicate of said master files;
   storing said image file on a memory device;
   verifying that said memory device contains a functional duplicate of said image file;
   isolating and repairing files in said image file copy stored on said memory device if said memory device does not contain a functional duplicate of said image file;
   copying said image file from said memory device to a master compact disc;
   extracting graphical representation material contained in said image file;
   labeling a surface of said master compact disc with said graphical representation material contained in said image file;
   verifying that said master compact disc contains a functional duplicate of said image file;
   isolating and repairing files in said image file copy on said master compact disc if said master compact disc does not contain a functional duplicate of said image file;
   verifying that said surface of said master compact disc displays a functional duplicate of said graphical representation material contained in said image file;
   isolating and repairing errors in production of said graphical representation on said surface of said master compact disc if said surface of said master compact disc does not contain a functional duplicate of said graphical representation material stored in said image file;
   copying said image file from said memory device to a compact disc-making machine;
   copying said image file from said compact disc-making machine to a blank compact disc to produce a production compact disc;
   labeling a surface of said production compact disc with said graphical representation material contained in said image file;
   verifying that said surface of said production compact disc displays a functional duplicate of said graphical representation material contained in said image file;
   isolating and repairing errors in production of said graphical representation on said surface of said production compact disc if said surface of said production compact disc does not contain a functional duplicate of said graphical representation stored in said image file;
   verifying that said production compact disc contains a functional duplicate of said image file from said compact-disc-making machine; and,
   isolating and repairing files in said image file copy on said production compact disc if said production compact disc does not contain a functional duplicate of said image file.

2. The method of claim 1 further comprising the step of including graphical information within said master files.

3. The method of claim 1 further comprising the step of formatting said master files in accordance with the International Organization for Standardization.

4. The method of claim 1 wherein said copying of said image file from said compact-disc-making machine to said production compact disc is performed as necessitated by demand for said production compact disc.

5. The method of claim 1 wherein said processes of verifying of said image file are performed by an MD5 data check.

6. A method of manufacturing computer media containing digital electronic executable programming files and non-executable data files comprising:
   providing a set of master files for duplication, said master files comprising digital electronic executable programming files, non-executable data files and graphical information;
   formatting said master files in accordance with the International Organization for Standardization;
   verifying that said master files are complete and functional;
   combining said master files into an image file;
   verifying that said image file contains a functional duplicate of said master files;
   repairing said image file if said image file does not contain said functional duplicate of said master files;
   storing said image file on a memory device;
   verifying that said memory device contains a functional duplicate of said image file;
   isolating and repairing files in said image file copy stored on said memory device if said memory device does not contain a functional duplicate of said image file;
   copying said image file from said memory device to a master compact disc;
   extracting graphical representation material contained in said image file;
   labeling a surface of said master compact disc with said graphical representation material contained in said image file;
   verifying that said master compact disc contains a functional duplicate of said image file;
   isolating and repairing files in said image file copy on said master compact disc if said master compact disc does not contain a functional duplicate of said image file;

verifying that said surface of said master compact disc displays a functional duplicate of said graphical representation material contained in said image file;
isolating and repairing errors in production of said graphical representation on said surface of said master compact disc if said surface of said master compact disc does not contain a functional duplicate of said graphical representation stored in said image file;
copying said image file from said memory device to a compact disc-making machine;
reproducing said image file from said compact disc-making machine to a blank compact disc to produce a production compact disc as necessitated by demand for said production compact disc;
verifying with said compact disc-making machine that said production compact disc contains a functional duplicate of said image file from said computer;
isolating and repairing files in said image file copy on said production compact disc if said production compact disc does not contain a functional duplicate of said image file;
labeling a surface of said production compact disc with said graphical representation material contained in said image file;
verifying that said surface of said production compact disc displays a functional duplicate of said graphical representation material contained in said image file; and,
isolating and repairing errors in production of said graphical representation on said surface of said production compact disc if said surface of said production compact disc does not contain a functional duplicate of said graphical representation stored in said image file.

7. The method of claim 6 wherein said processes of verifying of said image file are performed by an MD5 data check.

8. A compact disc containing digital electronic executable programming files and non-executable data files created by a process comprising:
providing a set of master files for duplication, said master files comprising digital electronic executable programming files and non-executable data files;
verifying that said master files are complete and functional;
combining said master files into an image file;
verifying that said image file contains a functional duplicate of said master files;
repairing said image file if said image file does not contain said functional duplicate of said master files;
storing said image file on a memory device;
verifying that said memory device contains a functional duplicate of said image file;
isolating and repairing files in said image file copy stored on said memory device if said memory device does not contain a functional duplicate of said image file;
copying said image file from said memory device to a master compact disc;
extracting graphical representation material contained in said image file;
labeling a surface of said master compact disc with said graphical representation material contained in said image file;
verifying that said master compact disc contains a functional duplicate of said image file;
isolating and repairing files in said image file copy on said master compact disc if said master compact disc does not contain a functional duplicate of said image file;
verifying that said surface of said master compact disc displays a functional duplicate of said graphical representation material contained in said image file;
isolating and repairing errors in production of said graphical representation material on said surface of said master compact disc if said surface of said master compact disc does not contain a functional duplicate of said graphical representation material stored in said image file;
copying said image file from said memory device to a compact disc-making machine;
copying said image file from said compact disc-making machine to a blank compact disc to produce a production compact disc;
labeling a surface of said production compact disc with said graphical representation material contained in said image file;
verifying that said surface of said production compact disc displays a functional duplicate of said graphical representation material contained in said image file;
isolating and repairing errors in production of said graphical representation on said surface of said production compact disc if said surface of said production compact disc does not contain a functional duplicate of said graphical representation stored in said image file;
verifying that said production compact disc contains a functional duplicate of said image file from said computer; and,
isolating and repairing files in said image file copy on said production compact disc if said production compact disc does not contain a functional duplicate of said image file.

9. The compact disc of claim 8 wherein said master files contain graphical information.

10. The compact disc of claim 8 wherein said master files are formatted in accordance with the International Organization for Standardization.

11. The method of claim 8 wherein said processes of verifying of said image file are performed by an MD5 data check.

12. The method of claim 8 wherein said processes of verifying of said image file are performed by an MD5 data check.

13. A compact disc containing digital electronic executable programming files and non-executable data files created by a process comprising:
providing a set of master files for duplication, said master files comprising digital electronic executable programming files, non-executable data files and graphical information;
formatting said master files in accordance with the International Organization for Standardization;
verifying that said master files are complete and functional;
combining said master files into an image file;
verifying that said image file contains a functional duplicate of said master files;
repairing said image file if said image file does not contain said functional duplicate of said master files;
storing said image file on a memory device;
verifying that said memory device contains a functional duplicate of said image file;
isolating and repairing files in said image file copy stored on said memory device if said memory device does not contain a functional duplicate of said image file;
copying said image file from said memory device to a master compact disc;
extracting graphical representation material contained in said image file;
labeling a surface of said master compact disc with said graphical representation material contained in said image file;
verifying that said master compact disc contains a functional duplicate of said image file;

isolating and repairing files in said image file copy on said master compact disc if said master compact disc does not contain a functional duplicate of said image file;

verifying that said surface of said master compact disc displays a functional duplicate of said graphical representation material contained in said image file;

isolating and repairing errors in production of said graphical representation material on said surface of said master compact disc if said surface of said master compact disc does not contain a functional duplicate of said graphical representation material stored in said image file;

copying said image file from said memory device to a compact disc-making machine;

reproducing said image file from said compact disc-making machine to a blank compact disc to produce a production compact disc as necessitated by demand for said production compact disc;

labeling a surface of said production compact disc with said graphical representation material contained in said image file;

verifying with said compact disc-making machine that said production compact disc contains a functional duplicate of said image file from said computer;

isolating and repairing files in said image file copy on said production compact disc if said production compact disc does not contain a functional duplicate of said image file;

verifying that said surface of said production compact disc displays a functional duplicate of said graphical representation material contained in said image file; and isolating and repairing errors in production of said graphical representation on said surface of said production compact disc if said surface of said production compact disc does not contain a functional duplicate of said graphical representation stored in said image file.

14. A system of manufacturing computer media that contains digital electronic executable programming files and non-executable data files comprising:

a set of master files for duplication, said master files comprising digital electronic executable programming files and non-executable data files;

a first comparator that verifies that said master files are complete and functional;

a computer that receives and combines said master files and creates an image file for mass production;

a second comparator that verifies that said image file contains a functional duplicate of said master files;

a repairer that repairs said image file if said image file does not contain said functional duplicate of said master files;

a memory device within said computer that stores said image file;

a third comparator that verifies that said memory device contains a functional duplicate of said image file;

a second repairer that isolates and repairs files in said image file copy stored on said memory device if said memory device does not contain a functional duplicate of said image file;

a master compact disc that receives a copy of said image file from said memory device;

a fourth comparator that verifies that said master compact disc contains a functional duplicate of said image file;

a third repairer that isolates and repairs files in said image file copy on said master compact disc if said master compact disc does not contain a functional duplicate of said image file;

a first labeling device that receives an output of graphical representation material contained in said image file and labels said master compact disc with said graphical representation material;

a fifth comparator that verifies that said master compact disc displays a functional duplicate of said graphical representation material contained in said image file;

a fourth repairer that isolates and repairs errors in production of said graphical representation material on said surface of said master compact disc if said surface of said master compact disc does not contain a functional duplicate of said graphical representation material stored in said image file;

a compact disc-making machine that receives a copy of said image file from said memory device within said computer and reproduces said image file on a blank computer disk to create a production compact disc;

a second labeling device that utilizes said graphical representation material contained in said image file and labels a surface of said production compact disc with said graphical representation material;

a sixth comparator that verifies that said surface of said production compact disc displays a functional duplicate of said graphical representation material contained in said image file;

a fifth repairer that isolates and repairs errors in production of said graphical representation on said surface of said production compact disc if said surface of said production compact disc does not contain a functional duplicate of said graphical representation stored in said image file;

a seventh comparator that verifies that said production compact disc contains a functional duplicate of said image file from said computer;

a sixth repairer that isolates and repairs files in said image file copy on said production compact disc if said production compact disc does not contain a functional duplicate of said image file.

15. The system of claim 14 wherein said set of master files further comprises a graphical information file.

16. The system of claim 14 wherein said master files are formatted in accordance with the International Organization for Standardization.

17. The system of claim 14 wherein said creation of said production compact disc is performed as necessitated by demand for said production compact disc.

18. The system of claim 14 wherein said first labeling device and said second labeling device are contained within said compact disc-making machine.

19. The system of claim 14 wherein said second, third, fourth, fifth, and seventh comparators verify said image file by performing by an MD5 data check.

* * * * *